(12) United States Patent
Vantomme et al.

(10) Patent No.: US 10,100,135 B2
(45) Date of Patent: Oct. 16, 2018

(54) PROCESS FOR PREPARING A POLYETHYLENE IN AT LEAST ONE CONTINUOUSLY STIRRED TANK REACTOR

(71) Applicant: Total Research & Technology Feluy, Seneffe (Feluy) (BE)

(72) Inventors: Aurelien Vantomme, Mignault (BE); Christopher Willocq, Bousval (BE); Alexandre Welle, Court-St. Etienne (BE); Martine Slawinski, Nivelles (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 0 days.

(21) Appl. No.: 15/318,010

(22) PCT Filed: Jun. 11, 2015

(86) PCT No.: PCT/EP2015/063006
§ 371 (c)(1),
(2) Date: Dec. 12, 2016

(87) PCT Pub. No.: WO2015/189306
PCT Pub. Date: Dec. 17, 2015

(65) Prior Publication Data
US 2017/0114159 A1 Apr. 27, 2017

(30) Foreign Application Priority Data
Jun. 12, 2014 (EP) .................................... 14172170

(51) Int. Cl.
*C08F 4/02* (2006.01)
*C08F 4/6592* (2006.01)
*C08F 10/02* (2006.01)
*C08F 4/659* (2006.01)

(52) U.S. Cl.
CPC ................ *C08F 10/02* (2013.01); *C08F 4/02* (2013.01); *C08F 4/025* (2013.01); *C08F 4/6592* (2013.01); *C08F 4/65916* (2013.01); *C08F 2420/04* (2013.01); *C08F 2500/05* (2013.01); *C08F 2500/18* (2013.01)

(58) Field of Classification Search
CPC .......... C08F 4/02; C08F 4/025; C08F 4/6592; C08F 4/65916; C08F 10/02
See application file for complete search history.

(56) References Cited

U.S. PATENT DOCUMENTS

| | | | |
|---|---|---|---|
| 6,787,616 B2* | 9/2004 | Takemori | C08F 10/02 502/120 |
| 2001/0039320 A1 | 11/2001 | Jacobsen et al. | |
| 2001/0044506 A1 | 11/2001 | Mehta et al. | |
| 2003/0207762 A9 | 11/2003 | Wenzel et al. | |
| 2012/0245307 A1* | 9/2012 | Slawinski | C08F 10/02 526/64 |
| 2015/0239999 A1* | 8/2015 | Willocq | C08F 10/02 526/64 |

FOREIGN PATENT DOCUMENTS

WO 0162847 A1 8/2001

OTHER PUBLICATIONS

International Search Report issued in PCT/EP2015/063006, dated Aug. 26, 2015, 3 pages.

* cited by examiner

*Primary Examiner* — Caixia Lu
(74) *Attorney, Agent, or Firm* — Albert Shung

(57) ABSTRACT

Processes for preparing a polyethylene in at least one continuously stirred tank reactor are described herein. The process may comprise the step of: polymerizing ethylene in the presence of at least one supported metallocene catalyst, a diluent, optionally one or more co-monomers, and optionally hydrogen, thereby obtaining the polyethylene, wherein the supported metallocene catalyst comprises a solid support, a co-catalyst and at least one metallocene, wherein the solid support has a surface area within the range of from 100 to 500 m2/g, and has a D50 value within the range of from 4 μm to 18 μm, with D50 being defined as the particle size for which fifty percent by weight of the particles has a size lower than the D50; and D50 being measured by laser diffraction analysis on a Malvern type analyzer. Polyethylene obtained by the disclosed process and articles comprising the polyethylene are also described.

14 Claims, No Drawings

PROCESS FOR PREPARING A POLYETHYLENE IN AT LEAST ONE CONTINUOUSLY STIRRED TANK REACTOR

CROSS-REFERENCE TO RELATED APPLICATIONS

This application claims the benefit of PCT/EP2015/063006, filed Jun. 11, 2015, which claims priority from EP 14172170.4 filed Jun. 12, 2014, which are incorporated herein by reference in their entireties for all purposes.

TECHNICAL FIELD OF THE INVENTION

The invention is in the field of polymers technology. In particular, the present invention relates to a process for preparing a polyethylene.

BACKGROUND OF THE INVENTION

Polyethylene (PE) is synthesized by polymerizing ethylene ($CH_2=CH_2$) monomers. Because it is cheap, safe, stable to most environments and easy to be processed, polyethylene polymers are useful in many applications. According to the properties, polyethylene can be classified into several types, such as but not limited to LDPE (Low Density Polyethylene), LLDPE (Linear Low Density Polyethylene), and HDPE (High Density Polyethylene). In another classification, the used polyethylene can be classified as Ultra High Molecular Weight (UHMW), High Molecular Weight (HMW), Medium Molecular Weight (MMVV) and Low Molecular Weight (LMW). Each type of polyethylene has different properties and characteristics.

Ethylene polymerization processes are frequently carried out in a loop reactor using ethylene monomer, liquid diluent and catalyst, optionally one or more co-monomer(s), optionally an activating agent or co-catalyst and optionally hydrogen. The polymerization in a loop reactor is usually performed under slurry conditions, with the produced polymer usually in the form of solid particles which are suspended in the diluent. The slurry in the reactor is circulated continuously with a pump to maintain efficient suspension of the polymer solid particles in the liquid diluent. Polymer slurry is discharged from the loop reactor. After the polymer product is collected from the reactor and the hydrocarbon residues are removed, the polymer product is dried, additives can be added and finally the polymer may be mixed and pelletized. The resulting product can then be used for the manufacturing of various objects.

Polymerization of polyolefin such as polyethylene can also be performed in continuous stirred tank reactors (CSTR). These polymerizations in CSTR are usually performed in the presence of Ziegler-Natta catalysts. Metallocene catalysts are not preferred because of lower intrinsic activity combined with shorter life time and higher sensitivity to contaminants. Intrinsically Ziegler-Natta catalysts lead to poorer product properties due to multiple site behavior. Additionally, Ziegler-Natta catalysts have limited comonomer response and lead to significant amount of polymer chains dissolved in the continuous phase.

Therefore, it is an object of the present invention to provide a process for preparing polyethylene prepared in at least one continuous stirred tank reactor having improved properties.

SUMMARY OF THE INVENTION

It is the finding of the present invention that the above object can be achieved by a process as presently claimed.

According to a first aspect, the present invention relates to a process for preparing a polyethylene in at least one continuously stirred tank reactor, comprising the step of: polymerizing ethylene in the presence of at least one supported metallocene catalyst, a diluent, optionally one or more co-monomers, and optionally hydrogen, thereby obtaining the polyethylene, wherein said supported metallocene catalyst comprises a solid support, a co-catalyst and at least one metallocene, wherein the solid support has a surface area within the range of from 100 to 500 $m^2/g$, and has a D50 value within the range of from 4 μm to 18 μm, with D50 being defined as the particle size for which fifty percent by weight of the particles has a size lower than the D50; and D50 being measured by laser diffraction analysis on a Malvern type analyzer.

The present invention further encompasses a polyethylene obtained by the process according to the first aspect of the invention.

The present invention also encompasses an article comprising a polyethylene prepared by the process according to the first aspect of the invention.

The present inventors have found that the present process allowed the preparation of small particle size polymer resin resulting in improved polymer properties, such as homogeneity of bimodal resin, and that the articles prepared with said metallocene-catalyzed polyethylene resin exhibited better mechanical and optical properties than articles prepared with Ziegler Natta catalyzed polyethylene resins.

The independent and dependent claims set out particular and preferred features of the invention. Features from the dependent claims may be combined with features of the independent or other dependent claims as appropriate. The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Before the present method used in the invention is described, it is to be understood that this invention is not limited to particular process, polyethylene resins, or articles described, as such process, polyethylene resins, or articles may, of course, vary. It is also to be understood that the terminology used herein is not intended to be limiting, since the scope of the present invention will be limited only by the appended claims.

When describing the processes of the invention, the terms used are to be construed in accordance with the following definitions, unless a context dictates otherwise.

As used herein, the singular forms "a", "an", and "the" include both singular and plural referents unless the context clearly dictates otherwise. By way of example, "a resin" means at least one resin.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Preferred statements (features) and embodiments of this invention are set herein below. Each statement and embodiment of the invention so defined may be combined with any other statement and/or embodiment unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 47, with any other statement and/or embodiment.

1. A process for preparing a polyethylene in at least one continuously stirred tank reactor, comprising the step of: polymerizing ethylene in the presence of at least one supported metallocene catalyst, a diluent, optionally one or more co-monomers, and optionally hydrogen, thereby obtaining the polyethylene,
   wherein said supported metallocene catalyst comprises a solid support, a co-catalyst and at least one metallocene,
   wherein the solid support has a surface area within the range of from 100 to 500 $m^2/g$, preferably from 150 $m^2/g$ to 400 $m^2/g$, preferably from 200 $m^2/g$ to 350 $m^2/g$, preferably from 200 $m^2/g$ to 300 $m^2/g$, and preferably from 250 $m^2/g$ to 300 $m^2/g$; and has a D50 value within the range of from 3 μm to 25 μm, with D50 being defined as the particle size for which fifty percent by weight of the particles has a size lower than the D50; and D50 being measured by laser diffraction analysis on a Malvern type analyzer.

2. A process for preparing a polyethylene in at least one continuously stirred tank reactor, comprising the step of: polymerizing ethylene in the presence of at least one supported metallocene catalyst, a diluent, optionally one or more co-monomers, and optionally hydrogen, thereby obtaining the polyethylene,
   wherein said supported metallocene catalyst comprises a solid support, a co-catalyst and at least one metallocene,
   wherein the solid support has a surface area within the range of from 100 to 500 $m^2/g$, preferably from 150 $m^2/g$ to 400 $m^2/g$, preferably from 200 $m^2/g$ to 350 $m^2/g$, preferably from 200 $m^2/g$ to 300 $m^2/g$, and preferably from 250 $m^2/g$ to 300 $m^2/g$; and has a D50 value within the range of from 4 μm to 18 μm, with D50 being defined as the particle size for which fifty percent by weight of the particles has a size lower than the D50; and D50 being measured by laser diffraction analysis on a Malvern type analyzer.

3. A process for preparing a polyethylene in at least one continuously stirred tank reactor, comprising the step of: polymerizing ethylene in the presence of at least one supported metallocene catalyst, a diluent, optionally one or more co-monomers, and optionally hydrogen, thereby obtaining the polyethylene, wherein said polyethylene at the end of said process has a silicon content lower than 60 ppm by weight, and a D50 of at least 100 and at most 400 μm, with D50 being defined as the particle size for which fifty percent by weight of the particles has a size lower than the D50, as measured by sieving techniques or optical measurements, preferably by sieving techniques.

4. The process according to statement 3, wherein said supported metallocene catalyst comprises a solid support, a co-catalyst and at least one metallocene.

5. The process according to any one of statements 1 to 4, wherein said at least one supported metallocene catalyst comprises a silica-containing solid support, an alumoxane, and least one metallocene.

6. The process according to any one of statements 1 to 5, wherein said at least one supported metallocene catalyst comprises a silica- and titania-containing solid support, an alumoxane, and least one metallocene.

7. The process according to statement 6, wherein the supported catalyst system has a Ti content of from 0.1 to 10% by weight (wt %) based on the total weight of the supported metallocene catalyst, for example from 0.5 to 5% by weight, for example from 1.0 to 2.5% by weight. Preferably from 1.0 to 10% by weight, more preferably from 0.5 to 10% by weight, even more preferably from 0.5 to 5.0% by weight. Most preferably, the Ti content is from 1.0 to 5% by weight, more preferably from 1.0 to 2.5% by weight, more preferably from 1.0 to 2.0% by weight, for example about 1.5% by weight based on the total weight of the supported metallocene catalyst.

8. The process according to any one of statements 1 to 7, wherein the solid support of said at least one supported metallocene catalyst has a particle size distribution of a span value lower than 2.0, preferably has a span value of at least 0.9 and at most 1.3, wherein the span is defined as:

$$\text{span} = \frac{D90 - D10}{D50}$$

with D90 being defined as the particle size for which ninety percent by weight of the particles has a size lower than the D90;

with D10 being defined as the particle size for which ten percent by weight of the particles has a size lower than the D10;

with D50 being defined as the particle size for which fifty percent by weight of the particles has a size lower than the D50; and with the D90, D10 and D50 being measured by laser diffraction analysis on a Malvern type analyzer.

9. The process according to any one of statements 1 to 8, wherein the solid support of said at least one supported metallocene catalyst has an average pore volume of at least 1.0 and at most 3.0 ml/g, preferably at least 1.0 and at most 2.5 ml/g, more preferably at least 1.2 and at most 2.0 ml/g.

10. The process according to any one of statements 1 to 9, wherein the metallocene catalyst is a compound of formula (I) or (II)

$$(Ar)_2MQ_2 \quad (I)$$

$$R''(Ar)_2MQ_2 \quad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, and a hydrocarbyl having 1 to 20 carbon atoms, and wherein said hydrocarbyl optionally contains one or more atoms selected from the group comprising B, Si, S, O, F, and P;

wherein M is a transition metal selected from the group consisting of titanium, zirconium, hafnium, and vanadium; and preferably is zirconium;

wherein each Q is independently selected from the group consisting of halogen, a hydrocarboxy having 1 to 20 carbon atoms, and a hydrocarbyl having 1 to 20 carbon atoms and wherein said hydrocarbyl optionally contains one or more atoms selected from the group comprising B, Si, S, O, F, and P; and wherein R" is a divalent group or moiety bridging the two Ar groups and selected from the group consisting of $C_1$-$C_{20}$ alkylene, germanium, silicon, siloxane, alkylphosphine, and an amine, and wherein said R" is optionally substituted with one or more substituents each independently selected from the group consisting of halogen, a hydrocarbyl having 1 to 20 carbon atoms, and wherein said hydrocarbyl optionally contains one or more atoms selected from the group comprising B, Si, S, O, F, and P.

11. The process according to any one of statements 1 to 10, wherein the metallocene catalyst is a compound selected from one of the following formula (III) or (IV):

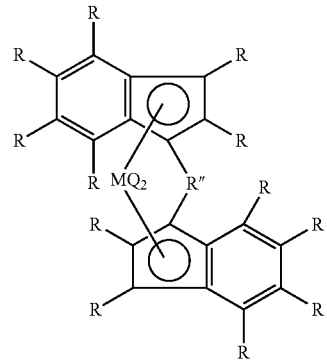

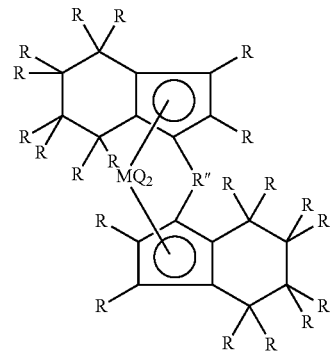

wherein each R in formula (III) or (IV) is the same or different and is selected independently from hydrogen or $XR'_v$ in which X is chosen from Group 14 of the Periodic Table, oxygen or nitrogen and each R' is the same or different and is chosen from hydrogen or a hydrocarbyl of from 1 to 20 carbon atoms and v+1 is the valence of X; R" is a structural bridge between the two indenyl or tetrahydrogenated indenyls that comprises a C1-C4 alkylene radical, a dialkyl germanium, silicon or siloxane, or an alkyl phosphine or amine radical; Q is a halogen or a hydrocarbyl radical having from 1 to 20 carbon atoms, preferably Q is F, Cl or Br; and M is a transition metal selected from the group consisting of titanium, zirconium, hafnium, and vanadium; and preferably is zirconium.

12. The process according to any one of statements 1 to 11, wherein the metallocene catalyst comprises a bridged unsubstituted bis-indenyl and/or a bridged unsubstituted bis-tetrahydrogenated indenyl.

13. The process according to any one of statements 1 to 12, wherein the metallocene catalyst comprises a bridged unsubstituted bis-tetrahydrogenated indenyl.

14. The process according to any one of statements 1 to 13, wherein the metallocene catalyst comprises at least one compound selected from the group comprising bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis (tetrahydroindenyl) zirconium dichloride, bis(indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.
15. The process according to any one of statements 1 to 14, wherein the metallocene catalyst comprises ethylene-bis (tetrahydroindenyl)zirconium dichloride or ethylene-bis (tetrahydroindenyl) zirconium difluoride.
16. The process according to any one of statements 1 to 15, wherein the solid support of said at least one supported metallocene catalyst has a D50 ranging of from 4.0 µm to 15.0 µm.
17. The process according to any one of statements 1 to 16, wherein the co-monomer is 1-butene.
18. The process according to any one of statements 1 to 17, wherein said diluent is selected from hexane, isohexane, or heptane
19. The process according to any one of statements 1 to 18, wherein said polymerization process is performed in the presence of at least one antifouling agent.
20. The process according to any one of statements 1 to 19, wherein said process is performed in at least two continuously stirred tank reactors connected in series.
21. The process according to any one of statements 1 to 20, wherein said polyethylene has a monomodal molecular weight distribution.
22. The process according to any one of statements 1 to 21, wherein said polyethylene has a bimodal molecular weight distribution.
23. The process according to any one of statements 1 to 22, wherein the solid support of said supported metallocene catalyst is a silica-containing support.
24. The process according to any one of statements 1 to 23, wherein the solid support of said supported metallocene catalyst is a silica-containing support comprising at least 20% by weight of silica, for example at least 40% by weight, for example at least 50% by weight of silica, preferably 100% of silica, preferably amorphous silica.
25. The process according to any one of statements 1 to 24, wherein the solid support of said supported metallocene catalyst is a silica-containing support having a surface area of at least 100 m$^2$/g, for example of at least 150 m$^2$/g, more preferably of at least 200 m$^2$/g, preferably to at most 400 m$^2$/g, more preferably to at most 350 m$^2$/g and more preferably to at most 300 m$^2$/g, for example from 100 m$^2$/g to 500 m$^2$/g, for example from 150 m$^2$/g to 400 m$^2$/g, for example from 200 m$^2$/g to 350 m$^2$/g, for example from 200 m$^2$/g to 300 m$^2$/g, preferably from 250 m$^2$/g to 300 m$^2$/g. The specific surface area is measured by N$_2$ adsorption using the well-known BET technique.
26. The process according to any one of statements 1 to 25, wherein the solid support of said supported metallocene catalyst is a silica-containing support having a D50 within the range of from 3.0 to 25.0 µm, preferably from 4.0 µm to 23.0 µm, preferably from 4.0 µm to 20.0 µm, preferably from 4.0 µm to 18.0 µm, preferably from 5.0 µm to 15.0 µm, preferably from 6.0 µm to 15.0 µm, preferably from 7.0 µm to 15.0 µm.
27. The process according to any one of statements 1 to 26, wherein the solid support has a surface area within the range of from 100 to 400 m$^2$/g, preferably from 100 m$^2$/g to 350 m$^2$/g, preferably from 100 m$^2$/g to 300 m$^2$/g, preferably from 200 m$^2$/g to 300 m$^2$/g, and preferably from 250 m$^2$/g to 300 m$^2$/g; and has a D50 value within the range of from 5.0 µm to 25.0 µm, preferably from 6.0 µm to 20.0 µm, preferably from 7.0 µm to 20.0 µm, preferably from 8.0 µm to 20.0 µm, preferably from 8.0 µm to 15.0 µm.

28. The process according to any one of statements 1 to 27, wherein the solid support of said supported metallocene catalyst is a silica-containing support having an average pore volume of at least 1.0 and at most 3.0 ml/g, preferably at least 1.0 and at most 2.5 ml/g, more preferably at least 1.2 and at most 2.0 ml/g.
29. The process according to any one of statements 1 to 28, wherein said at least one supported metallocene catalyst is comprising a silica- and titania-containing support comprising an alumoxane at and least one metallocene; obtainable by a process comprising the following step: a) titanating a silica-containing support having a specific surface area of from 100 m$^2$/g to 500 m$^2$/g, preferably 150 to 400 m$^2$/g, more preferably 200 m$^2$/g to 350 m$^2$/g, and having a D50 of at least 3.0 µm and at most 25.0 µm; preferably from 4.0 µm to 23.0 µm, preferably from 4.0 µm to 20.0 µm, preferably from 4.0 µm to 18.0 µm, preferably from 4.0 µm to 15.0 µm; by impregnating the support with a titanium compound to form a titanated silica-containing catalyst support; wherein the supported catalyst system further comprises an alumoxane and a metallocene.
30. The process according to statement 29, wherein the titanium compound is selected from $R^3_x Ti(OR^4)_y$, and/or $(R^3 O)_x Ti(OR^4)_y$, wherein $R^3$ and $R^4$ are the same or different and are selected from hydrocarbyl groups containing from 1 to 12 carbon, halogens, preferably chlorine and fluorine, and hydrogen, and wherein x is 0 to 4, y is 0 to 4 and y+x equals 4.
31. The process according to statement 29 or 30, wherein the titanium compound is one or more compounds of formula $Ti(OR^5)_4$ wherein each $R^5$ is the same or different and can be an alkyl or cycloalkyl group each having from 3 to 5 carbon atoms, and mixtures thereof.
32. The process according to any one of statements 29 to 31, wherein the titanium compound is selected from the group comprising $Ti(OC_4H_9)_4$, $Ti(OC_3H_7)_4$ and mixtures thereof.
33. The process according to any one of statements 29 to 32, wherein the titanium compound is a mixture comprising $Ti(OC_4H_9)_4$ and $Ti(OC_3H_7)_4$.
34. The process according to any one of statements 1 to 33, wherein said process is performed in at least two continuously stirred tank reactors connected in series, under slurry conditions.
35. The process according to any one of statements 1 to 34, wherein said polymerization process is performed in the presence of at least one antifouling agent at a level of from 0.1 to 50 ppm, preferably from 1.0 to 20 ppm, preferably from 1.0 to 10.0 ppm, preferably from 2.0 to 6.0 ppm, preferably from 2.0 to 5.0 ppm.
36. The process according to any one of statements 1 to 35, wherein said polyethylene at the end of said process has a D50 of at least 100 and at most 400 µm, preferably at most 350 µm, preferably at most 300 µm, preferably at most 250 µm.
37. The process according to any one of statements 1 to 36, wherein said polyethylene at the end of said process has a silicon content lower than 60 ppm by weight, preferably lower than 55 ppm by weight, more preferably lower than 50 ppm by weight, for example from 5 to 60 ppm by weight, for example from 5 to 55 ppm by weight, for example from 5 to 50 ppm by weight.
38. The process according to any one of statements 1 to 37, wherein said polyethylene at the end of said process has a D50 of at least 100 and at most 400 µm, and a silicon content lower than 60 ppm by weight; for example a D50 of at least 100 and at most 350 μm, preferably of at least 100 and at most 300 μm, preferably of at least 100 at most 250 μm, and a silicon content lower than 60 ppm by weight, preferably lower than 55 ppm by weight, more preferably lower than 50 ppm by weight.

39. A polyethylene prepared according to the process of any one of statements 1 to 38.

40. A polyethylene prepared in at least one CSTR in the presence of at least one supported metallocene catalyst, wherein said polyethylene has a D50 ranging from 100 to 400 μm, with D50 being defined as the particle size for which fifty percent by weight of the particles has a size lower than the D50. Preferably, the polyethylene has a D50 of at most 350 μm, preferably at most 300 μm, preferably at most 250 μm.

41. A polyethylene prepared in at least one CSTR in the presence of at least one supported metallocene catalyst, wherein said polyethylene has a Si content of at most 60 ppm by weight, for example at most 55 ppm by weight, for example at most 50 ppm by weight, preferably from 5 to 60 ppm by weight, for example from 5 to 55 ppm by weight, for example from 5 to 50 ppm by weight.

42. The polyethylene according to any one of statements 39 to 41, wherein said polyethylene has a bimodal molecular weight distribution.

43. The polyethylene according to any one of statements 39 to 42, wherein said polyethylene has a D50 ranging from 100 to 400 μm, and a Si content of at most 60 ppm by weight.

44. The polyethylene according to any one of statements 39 to 43, wherein the polyethylene has a D50 of at most 350 μm, for example at most 300 μm, for example at most 250 μm, and a Si content of at most 60 ppm by weight, for example at most 55 ppm by weight, for example at most 50 ppm by weight, for example from 5 to 60 ppm by weight, for example from 5 to 55 ppm by weight, for example from 5 to 50 ppm by weight.

45. The polyethylene according to any one of statements 39 to 44, wherein polyethylene has a density of at least 940 g/cm$^3$, as measured according to ASTM D-1505 at 23° C.

46. An article comprising a polyethylene prepared according to the process of any one of the statements 1 to 38, or a polyethylene according to any one of statements 39 to 45.

47. The article according to statement 46, wherein said article is selected from the group comprising films, pipes, preferably pipes PERT (polyethylene of Raised Temperature resistance), injection molded articles, injection stretch blow molded articles, rotomoulded articles, caps and closures, fibers, sheets, containers, and foams.

The present invention provides a process for preparing a polyethylene in at least one continuously stirred tank reactor, comprising the step of: polymerizing ethylene in the presence of at least one supported metallocene catalyst, a diluent, optionally one or more co-monomers, and optionally hydrogen, thereby obtaining the polyethylene, wherein said supported metallocene catalyst comprises a solid support, a co-catalyst and at least one metallocene, wherein the solid support of said supported metallocene catalyst has a surface area within the range of from 100 to 500 m$^2$/g, and has a D50 value within the range of from 3 μm to 25 μm, preferably from 4 μm to 18 μm, for example from 4 μm to 15 μm, and with D50 being defined as the particle size for which fifty percent by weight of the particles has a size lower than the D50; and D50 being measured by laser diffraction analysis on a Malvern type analyze.

The process comprises polymerizing ethylene in the presence of at least one supported metallocene catalyst, a diluent, optionally one or more co-monomers, and optionally hydrogen.

As used herein, the term "catalyst" refers to a substance that causes a change in the rate of a polymerization reaction. In the present invention, it is especially applicable to catalysts suitable for the polymerization of ethylene to polyethylene. The present invention especially relates to metallocene catalysts, in particular to supported metallocene catalysts.

The metallocene catalyst refers to any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In one embodiment of the present invention, the metallocene catalyst is a compound of formula (I) or (II)

$$(Ar)_2MQ_2 \qquad (I);$$

$$R''(Ar)_2MQ_2 \qquad (II),$$

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, and a hydrocarbyl having 1 to 20 carbon atoms, and wherein said hydrocarbyl optionally contains one or more atoms selected from the group comprising B, Si, S, O, F, and P;
wherein M is a transition metal selected from the group consisting of titanium, zirconium, hafnium, and vanadium; and preferably is zirconium;
wherein each Q is independently selected from the group consisting of halogen, a hydrocarboxy having 1 to 20 carbon atoms, and a hydrocarbyl having 1 to 20 carbon atoms and wherein said hydrocarbyl optionally contains one or more atoms selected from the group comprising B, Si, S, O, F, and P; and
wherein R" is a divalent group or moiety bridging the two Ar groups and selected from the group consisting of $C_1$-$C_{20}$ alkylene, germanium, silicon, siloxane, alkylphosphine, and an amine, and wherein said R" is optionally substituted with one or more substituents each independently selected from the group consisting of halogen, a hydrocarbyl having 1 to 20 carbon atoms, and wherein said hydrocarbyl optionally contains one or more atoms selected from the group comprising B, Si, S, O, F, and P. As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups, preferably methoxy, ethoxy, butoxy and amyloxy.

As used herein, the term "alkyl", by itself or as part of another substituent, refers to straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$.

As used herein, the term "cycloalkyl", by itself or as part of another substituent, refers to a saturated or partially saturated cyclic alkyl radical. Cycloalkyl groups have the general formula $C_nH_{2n-1}$. When a subscript is used herein following a carbon atom, the subscript refers to the number of carbon atoms that the named group may contain. Thus, examples of $C_{3-6}$cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3,4-tetrahydro-naphthyl. When a subscript is used herein following a carbon atom, the subscript refers to the number of carbon atoms that the named group may contain.

As used herein, the term "alkylaryl", by itself or as part of another substituent, refers to refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to an alkyl group as defined herein, wherein a hydrogen atom is replaced by a aryl as defined herein. When a subscript is used herein following a carbon atom, the subscript refers to the number of carbon atoms that the named group may contain. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—$CH_2$—$CH_2$—$CH_2$—CH($CH_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, $C_1$-$C_{20}$ alkylene refers to an alkylene having between 1 and 20 carbon atoms. Exemplary halogen atoms include chlorine, bromine, fluorine and iodine, wherein fluorine and chlorine are preferred.

Preferably, the metallocene comprises a bridged bis-indenyl and/or a bridged bis-tetrahydrogenated indenyl catalyst component. More preferably, the metallocene is selected from one of the following formula (III) or (IV):

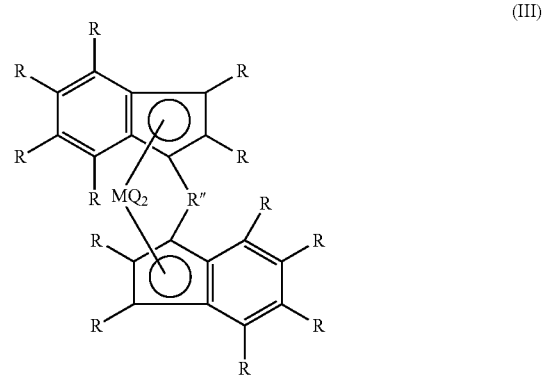

(III)

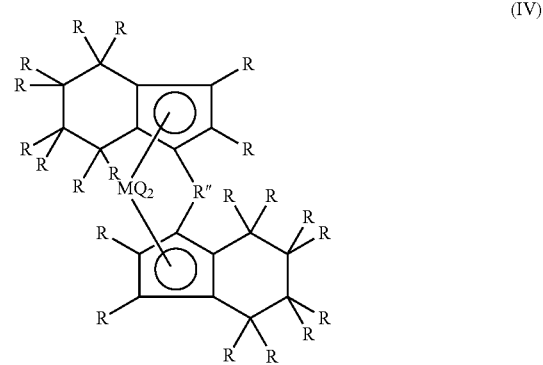

(IV)

wherein each R is the same or different and is selected independently from hydrogen or $XR'v$ in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal selected from the group consisting of titanium, zirconium, hafnium, and vanadium; and preferably is zirconium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents XR'v on the cyclopentadienyl ring are preferably methyl. More preferably, at least one and most preferably both cyclopentadienyl rings are unsubstituted.

In a particularly preferred embodiment the metallocene catalyst comprises a bridged unsubstituted bis-indenyl and/or a bridged unsubstituted bis-tetrahydrogenated indenyl.

In another particularly preferred embodiment the metallocene catalyst comprises a bridged unsubstituted bis-tetrahydrogenated indenyl.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl) (fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylene-bis (tetrahydroindenyl)zirconium dichloride or ethylene-bis (tetrahydroindenyl) zirconium difluoride.

The metallocene catalysts used herein are provided on a solid support. The support can be an inert organic or inorganic solid, which is chemically unreactive with any of the components of the metallocene catalyst.

Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Examples of such mixed oxides are the silica-aluminas. Most preferred is a silica compound.

Preferred supports are silica-containing supports comprising at least 20% by weight of silica, for example at least 40% by weight, for example at least 50% by weight of amorphous silica. The silica-containing support may also contain one or more of alumina, magnesia, zirconia and the like.

Preferably the support is a silica support i.e. essentially 100% by weight of silica, or a silica-titania, or a silica-alumina support. In the case of silica-alumina supports, the support preferably comprises at most 15% by weight of alumina.

According to the invention, the solid support of the supported metallocene catalyst is a support having a surface area within the range of 100 to 500 $m^2/g$, preferably a porous support having a surface area within the range of 100 to 500 $m^2/g$, preferably a porous silica support having a surface area within the range of 100 to 500 $m^2/g$. Suitable silica support are, for example, amorphous silica having a surface area of at least 100 $m^2/g$ and at most 500 $m^2/g$. Preferably of at least 150 $m^2/g$, more preferably of at least 200 $m^2/g$, preferably to at most 400 $m^2/g$, more preferably to at most 350 $m^2/g$ and more preferably to at most 300 $m^2/g$, for example from 100 $m^2/g$ to 500 $m^2/g$, for example from 150 $m^2/g$ to 400 $m^2/g$, for example from 200 $m^2/g$ to 350 $m^2/g$, for example from 200 $m^2/g$ to 300 $m^2/g$, preferably from 250 $m^2/g$ to 300 $m^2/g$. The specific surface area is measured by $N_2$ adsorption using the well-known BET technique. It is to be understood that the surface area referred herein, it the surface area measured for the solid support without any catalyst activator (co-catalyst).

For example, the surface area, along with pore volume, can be measured by nitrogen porosimetry using an Autosorb 6 analyzer (Quantachrome Corporation, Boynton Beach, Fla., USA). Samples are first outgassed at 350° C. for 4 hours on the instrument's outgassing station prior to measurement. The sample tube (containing the outgassed sample) is transferred to the analysis station, submerged in liquid nitrogen and a nitrogen isotherm determined. A surface area is calculated using BET theory taking data points in the P/Po range 0.05 to 0.30 (P/P0=relative pressure). A pore volume measurement is recorded at P/Po of 0.98 on the adsorption leg.

According to the invention, the support has a D50 value within the range of from 3 µm to 25 µm, with D50 being defined as the particle size for which fifty percent by weight of the particles has a size lower than the D50. In some embodiments, the support has a D50 of at most 23 µm, preferably of at most 20 µm, preferably of at most 18 µm, preferably of at most 15 µm. In some preferred embodiments, the support is an amorphous silica having a D50 of at least 3.0 µm, preferably at least 4.0 µm, preferably at least 4.5 µm, most preferably at least 4.0 and at most 15.0 µm. Preferably, said support has a D50 within the range of from 4.0 µm to 23.0 µm, preferably from 4.0 µm to 20.0 µm, preferably from 4.0 µm to 18.0 µm, preferably from 4.0 µm to 15.0 µm. It is to be understood that the solid support D50 referred herein is the D50 measured for the solid support without any catalyst activator (co-catalyst).

The measurement of the particle size can be made according to the International Standard ISO 13320:2009 ("Particle size analysis—Laser diffraction methods"). For example, the D50 can be measured by laser diffraction analysis. Malvern Instruments' laser diffraction systems may advantageously be used. Preferably, the support particle size is measured by laser diffraction analysis on a Malvern type analyzer. The particle size may be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 µm, by applying the theory of Mie, using appropriate optical means. In some preferred embodiments, the support has a D50 of at most 25 µm, preferably of at most 23 µm, preferably of at most 20 µm, preferably of at most 18 µm, preferably of at most 15 µm, with D50 being defined as the particle size for which fifty percent by weight of the particles has a size lower than the D50, as measured according to the International Standard ISO 13320:2009 ("Particle size analysis—Laser diffraction methods") with the Mastersizer S by applying the theory of Mie. A non-limiting example of a suitable silica support having a D50 value within the range of from 3 µm to 25 µm, can be for example silica support sold by PQ Corporation under the name PD-10001 having a D50 of about 12.5 µm and a surface area of 285 $m^2/g$.

Such a small catalyst particle size improves degassing and decreases fouling. Also, small catalyst particle size improves downstream processes. Furthermore, small catalyst particle size results in improved polyethylene properties, and therefore also articles prepared from such improved polyethylene exhibit also better properties.

In an embodiment, the support of the supported metallocene catalyst is a support having an average pore volume within the range of 1.0 to 3.0 ml/g, and preferably a porous silica support having an average pore volume within the range of 1.0 to 2.5 ml/g. Supports with a pore volume of 1.2 to 2.0 ml/g are preferred. Pore volume is measured by $N_2$ desorption using the BJH method for pores with a diameter of less than 1000 Å. In some preferred embodiments, the support is an amorphous silica having an average pore volume of at least 1.0 and at most 3.0 ml/g, preferably at least 1.0 and at most 2.5 ml/g, more preferably at least 1.2 and at most 2.0 ml/g. Supports with too small porosity may result in a loss of melt index potential and in a lower activity.

In a preferred embodiment, said solid support is a silica- and titania-containing support. Preferably said silica- and titania-containing support has a surface area within the range of 100 to 500 $m^2/g$. Preferably of at least 150 $m^2/g$, more preferably of at least 200 $m^2/g$, preferably to at most 400 $m^2/g$, more preferably to at most 350 $m^2/g$ and more preferably to at most 300 $m^2/g$, for example from 100 $m^2/g$ to 500 $m^2/g$, for example from 150 $m^2/g$ to 400 $m^2/g$, for example from 200 $m^2/g$ to 350 $m^2/g$, for example from 200 $m^2/g$ to 300 $m^2/g$, preferably from 250 $m^2/g$ to 300 $m^2/g$.

Preferably said silica- and titania-containing support has a D50 value within the range of from 3 μm to 25 μm. Preferably, the silica- and titania-containing support has a D50 of at most 23 μm, preferably of at most 20 μm, preferably of at most 18 μm, preferably of at most 15 μm. Preferably, the silica- and titania-containing support has a D50 of at least 3.0 μm, preferably at least 4.0 μm, preferably at least 4.5 μm, most preferably at least 4.0 and at most 15.0 μm.

Preferably said silica- and titania-containing support has an average pore volume of at least 1.0 and at most 3.0 ml/g, preferably at least 1.0 and at most 2.5 ml/g, more preferably at least 1.2 and at most 2.0 ml/g.

In a preferred embodiment, said silica- and titania-containing support can be prepared by a process comprising the following step: titanating a silica-containing support having a specific surface area of from 100 $m^2/g$ to 500 $m^2/g$, preferably 150 to 400 $m^2/g$, more preferably 200 $m^2/g$ to 350 $m^2/g$, and having a D50 of at least 3.0 μm and at most 25.0 μm; preferably from 5.0 μm to 23.0 μm, preferably from 5.0 μm to 20.0 μm, preferably from 5.0 μm to 18.0 μm, preferably from 5.0 μm to 15.0 μm; by impregnating the support with a titanium compound, preferably of the general formula selected from $R^3{}_x Ti(OR^4)_y$ and $(R^3O)_x Ti(OR^4)_y$, wherein $R^3$ and $R^4$ are the same or different and are selected from hydrocarbyl groups containing from 1 to 12 carbon, halogens, preferably chlorine and fluorine, and hydrogen, and wherein x is 0 to 4, y is 0 to 4 and y+x equals 4; to form a titanated silica-containing catalyst support. In some preferred embodiments, the silica-containing support has an average pore volume of at least 1.0 and at most 3.0 ml/g, preferably at least 1.0 and at most 2.5 ml/g, more preferably at least 1.2 and at most 2.0 ml/g. The silica-containing support can be commercially available as described herein above, or can be prepared by various known techniques such as but not limited to gelification, precipitation and/or spray-drying.

Preferably, the silica-containing support is loaded with one or more titanium compounds selected from $R^3{}_x Ti(OR^4)_y$ and $(R^3O)_x Ti(OR^4)_y$, wherein $R^3$ and $R^4$ are the same or different and are selected from hydrocarbyl groups containing from 1 to 12 carbon, halogens, preferably chlorine and fluorine, and hydrogen, and wherein x is 0 to 4, y is 0 to 4 and y+x equals 4. The titanium compound is preferably selected from the group consisting of tetraalkoxides of titanium having the general formula $Ti(OR^5)_4$ wherein each $R^5$ is the same or different and can be an alkyl or cycloalkyl group each having from 3 to 5 carbon atoms, and mixtures thereof.

The titanium compound(s) with which the support is impregnated is more preferably selected from alkyl titanates, preferably selected from e.g. $Ti(OC_4H_9)_4$, $Ti(OC_3H_7)_4$. More preferably a mixture of alkyl titanates are used e.g. a mixture of $Ti(OC_4H_9)_4$ and $Ti(OC_3H_7)_4$. Most preferably the mixture has a weight ratio of 20/80 of $Ti(OC_4H_9)_4$ to $Ti(OC_3H_7)_4$. The impregnation of the support with alkyl titanate is preferably performed by introducing the titanium compound(s) in a suspension in a diluent such as an organic solvent e.g. hexane or iso-hexane, or dissolved in an aqueous solvent. The suspension is preferably added drop-wise to the support. The suspension is then mixed preferably for at least 1 hour, more preferably at least 2 hours.

In an embodiment, the final amount of titanium present (the Ti content) in the supported catalyst is at least 0.1% by weight based on the total weight of the supported metallocene catalyst. The resulting supported catalyst system preferably has a Ti content of from 0.1 to 12% by weight, preferably from 0.1 to 10% by weight, more preferably from 0.5 to 10% by weight, for example from 1.0 to 10% by weight, for example from 0.5 to 5.0% by weight. Most preferably, the Ti content is from 1.0 to 5% by weight, more preferably from 1.0 to 2.5% by weight, more preferably from 1.0 to 2.0% by weight, for example about 1.5% by weight based on the total weight of the supported metallocene catalyst.

This process may further comprise the step of drying the Ti-impregnated catalyst support.

The support is preferably dried after titanation, preferably by heating to a temperature of from at least 100° C., preferably of at least 250° C., more preferably of at least 270° C. This step generally lasts for at least 1 hour, more preferably at least 2 hours, most preferably at least 4 hours. The drying can take place in an atmosphere of dry and inert gas and/or air, preferably nitrogen. The drying may be carried out in a fluidized bed.

After impregnation and optional drying, the titanated catalyst support can be stored under a dry and inert atmosphere, for example, nitrogen, at ambient (room) temperature.

In another embodiment, said silica- and titania-containing support can be prepared by a process comprising the following step: gelification (i.e. co-precipitation) of a silica precursor with a titanium precursor in solution. The silica precursor can also be selected from one or more of the group having the general formula $R^1{}_n Si(OR^2)_m$ or $(R^1O)_n Si(OR^2)_m$, wherein $R^1$ and $R^2$ are the same or different and are selected from hydrocarbyl groups comprising from 1 to 12 carbon, halogens and hydrogen, and wherein n is 0 to 4, m is 0 to 4 and m+n equals 4.

The titanium precursor can be co-precipitated in any form from which it is subsequently convertible to titanium oxide in the gel. Compounds suitable include inorganic and organic compounds of titanium such as halides, nitrates, sulfates, oxalates, alkyl titanates, alkoxides, oxides, etc. Preferred titanium compounds are the same as those described for the impregnation process. The co-precipitation of the titanium precursor and the silica precursor can be performed in solution, preferably in an acidic or basic environment. The co-precipitated support of the catalyst can be obtained using the following steps: co-precipitating precursors of titania and silica in solution in order to generate a gel; aging the gel; washing the gel to remove undesirable salts; drying the gel to obtain the co-precipitated silica and titania containing support. The co-precipitated support of the supported catalyst system can be prepared by first forming a gel by mixing an aqueous solution of the silica precursor with a solution of the titania precursor in a strong acid, e.g. such as sulphuric acid, this mixing being done under suitable conditions of agitation. The concentration of the silica-titania in the gel which is formed can be in the range of between 0.1 to 12% by weight. In an embodiment, the pH of the gel is from 3 to 9. A wide range of mixing temperatures can be employed, this range can be from above 0° C. to around 80° C. After gelling, the mixture can be aged. This can be carried out at temperatures within the range of about 20° C. to less than 100° C. Aging times of at least 10 minutes can be used, for example at least one hour. Following the aging, the gel can be agitated to produce a slurry which can be washed several times with, for example, water and for example, with either an ammonium salt solution or dilute acid to reduce the alkali metal content (the undesirable salts) in the gel to for example less than about 0.1 weight percent. While various ammonium salts and dilute acid solutions can be employed, the preferred ammonium salts are those, such as ammonium nitrate and ammonium salts of organic acids, which decompose and volatilize upon subsequent drying. Water is removed from the gel in any suitable manner and for example by washing with a normally liquid organic compound which is soluble in water, or by azeotropic distillation employing an organic compound e.g. ethyl acetate. Remaining solvents can be removed by drying, for example in air, at least 110° C., preferably at least 150° C., more preferably at least 200° C. This step generally lasts for at least 1 hour. The drying can take place in an atmosphere of dry and inert gas and/or air, such as nitrogen. The drying may be carried out in a fluidized bed. The drying can be performed by spray drying in order to have co-precipitated silica and titania containing support having a D50 ranging from 3 µm to 25 µm.

The supported metallocene catalyst is activated with a co-catalyst. The co-catalyst, which activates the metallocene catalyst component, can be any co-catalyst known for this purpose such as an aluminium-containing co-catalyst, a boron-containing co-catalyst or a fluorinated catalyst. The aluminium-containing co-catalyst may comprise an alumoxane, an alkyl aluminium, a Lewis acid and/or a fluorinated catalytic support.

In an embodiment, alumoxane is used as an activating agent for the supported metallocene catalyst. As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (V) or (VI)

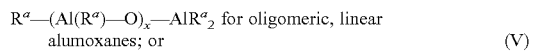

$R^a$—(Al($R^a$)—O)$_x$—Al$R^a_2$ for oligomeric, linear alumoxanes; or (V)

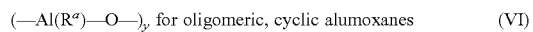

(—Al($R^a$)—O—)$_y$ for oligomeric, cyclic alumoxanes (VI)

wherein x is 1-40, and preferably 10-20;
wherein y is 3-40, and preferably 3-20; and
wherein each $R^a$ is independently selected from a $C_1$-$C_8$alkyl, and preferably is methyl. In a preferred embodiment, the alumoxane is methylalumoxane (MAO).

In a preferred embodiment, the metallocene catalyst is a supported metallocene-alumoxane catalyst comprising a metallocene and an alumoxane which are bound on a porous silica support. Preferably, the metallocene catalyst is a bridged bis-indenyl catalyst and/or a bridged bis-tetrahydrogenated indenyl catalyst.

One or more aluminiumalkyl represented by the formula AlR$^b_x$ can be used as additional co-catalyst, wherein each R$^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

The treatment of the catalyst support with the alumoxane can be carried out according to any known method known by the person skilled in the art. Advantageously, the alumoxane, preferably MAO, is mixed in an inert diluent/solvent, preferably toluene, with the catalyst support. Alumoxane deposition preferably occurs at a temperature between 60° C. to 120° C., more preferably 80° C. to 120° C., most preferably 100° C. to 120° C. The amount of MAO is calculated to reach the desired aluminium loading.

The process may further comprise the following step: treating the solid support with a metallocene.

The catalyst support is treated with a metallocene either during treatment with the catalyst activating agent (1-pot method) or thereafter. Any metallocene known in the art can be applied, including a mixture of different metallocenes. Suitable metallocene have been described herein above.

The support is treated with the metallocene, advantageously by mixing the desired metallocene(s) with the MAO-modified support. Preferably mixing occurs at room temperature for a duration of at least 15 min, preferably at least 1 hour, more preferably at least 2 hours.

In a particular embodiment, the molar ratio of aluminum, provided by the alumoxane, to transition metal, provided by the metallocene, of the catalyst is between 20 and 200, and for instance between 30 and 150, or preferably between 30 and 100.

The process of the invention is performed in at least one continuous stirred tank reactor. As used herein, the term "continuous stirred tank reactor", or "Continuously-Stirred Tank Reactor" or "CSTR" is known in the art and refers to a tank having a stirring means, wherein one or more reagents are continuously introduced into the tank whilst at least one product stream is continually removed from the tank.

A CSTR usually comprises a tank, and a stirring system to mix reactants together. Feed and exit pipes are present to introduce reactants and remove products. Reactants can be continuously introduced into the reactor through ports at the top, while products are continuously removed. The stirring system can comprise stirring blades, which are also called agitators.

The present invention encompasses process of producing a polyethylene. In an embodiment, the polyethylene may be produced in at least one CSTR, for example at least two CSTRs connected in series.

Preferably, the present invention encompasses a process for preparing a polyethylene in at least one CSTR, under slurry conditions. More preferably, the present invention encompasses a process for preparing a polyethylene in at least two CSTR reactors connected in series, under slurry conditions.

As used herein, the term "slurry" or "polymer slurry" or "polymerization slurry" means substantially a multi-phase composition including at least polymer solids and a liquid phase, the liquid phase being the continuous phase. The solids include catalyst and a polymerized olefin, such as polyethylene. The liquids include an inert diluent, dissolved monomer such as ethylene, optionally one or more co-monomers, optionally molecular weight control agents, such as hydrogen; antistatic agents; antifouling agents; scavengers; and other process additives.

As used herein, the term "diluent" refers to diluents in a liquid state, liquid at room temperature and preferably liquid under the pressure conditions in the CSTR. Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of diluents are isohexane, hexane, butane, isobutane, pentane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isohexane. However, it should be clear from the present invention that other diluents may as well be applied according to the present invention.

Suitable ethylene polymerization includes but is not limited to homopolymerization of ethylene monomer, copolymerization of ethylene and one or more higher 1-olefin co-monomers.

As used herein, the term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, isohexene, 1-octene, 1-decene, 1-dodecene, 1-tetradecene, 1-hexadecene, 1-octadecene and 1-eicosene. The term "copolymer" refers to a polymer, which is made by linking two different types of in the same polymer chain. The term "homopolymer" refers to a polymer which is made by linking ethylene monomers, in the absence of co-monomers. In an embodiment of the present invention, said co-monomer is 1-butene.

In a preferred embodiment, suitable reactants for use in the polymerization comprise the monomer ethylene, isohexane or hexane as hydrocarbon diluent, a supported metallocene catalyst, and optionally at least one co-monomer such as 1-butene.

The polymerization may be performed over a wide temperature range. Preferably, the temperature is within the range of 65° C. to 90° C. A more preferred range is from 70° C. to 85° C., more preferably from 73° C. to 85° C.

The reactor pressure is preferably held ranging from 0.65 to 10 bar.

In an embodiment of the present invention, the process may further comprise a pre-polymerization step comprising contacting ethylene with the metallocene catalyst. In an embodiment, said pre-polymerization is performed in a reactor having a smaller size compared to the polymerization reactor. Said pre-polymerization can be performed in a loop reactor or a CSTR.

In an embodiment of the present invention, the polyethylene has a monomodal molecular weight distribution.

In an embodiment of the present invention, the polyethylene has a multimodal molecular weight distribution.

In a preferred embodiment of the present invention, the polyethylene has a bimodal molecular weight distribution.

By the term "monomodal polyethylene" or "polyethylene with a monomodal molecular weight distribution" it is meant, polyethylene having one maxima in their molecular weight distribution curve defined also as unimodal distribution curve. By the term "polyethylene with a bimodal molecular weight distribution" or "bimodal polyethylene" it is meant, polyethylene having a distribution curve being the sum of two unimodal molecular weight distribution curves. By the term "polyethylene with a multimodal molecular weight distribution" or "multimodal polyethylene product" it is meant polyethylene with a distribution curve being the sum of at least two, preferably more than two unimodal distribution curves.

The process according to the present invention may be performed in the presence of at least one antifouling agent.

As used in the present invention, the term "antifouling agent" refers to material that prevents fouling of the inside of the reactor wall.

In an embodiment, the antifouling agent comprises cationic agents, anionic agents, nonionic agents, organometallic agents, polymeric agents or mixtures thereof.

Suitable examples of cationic agents can be selected from quaternary ammonium, sulfonium or phosphonium salts with long, preferably $C_{5-20}$, hydrocarbon chain, for example chloride, sulfate, nitrate, or hydrogen phosphate salts thereof.

Examples of suitable anionic agents can be selected from sulfated oils, sulfated amide oils, sulfated ester oils, fatty alcohol sulfuric ester salts, alkyl sulfuric ester salts, fatty acid ethyl sulfonic acid salts, alkyl sulfonic acid salts, for example sodium alkyl sulfonates, alkylnaphthalene-sulfonic acid salts, alkylbenzene-sulfonic acid salts, phosphoric esters, for example alkyl phosphonates, alkyl phosphates, alkyl dithiocarbamate or mixtures thereof.

Examples of suitable nonionic agents can be selected from partial fatty acid esters of polyhydric alcohols; alkoxylated fatty alcohols such as ethoxylated or propoxylated fatty alcohols; polyethylene glycol (PEG) esters of fatty acids and alkylphenols; glyceryl esters of fatty acids and sorbitol esters; ethylene oxide adducts of fatty amines or fatty acid amides; ethylene oxide adducts of alkylphenols; ethylene oxide adducts of alkylnaphthols; polyethylene glycol, and fatty acid esters of alkyldiethanolamines, or mixtures thereof.

Examples of suitable organometallic agents can be selected from neoalkyl titanates and zirconates, or mixtures thereof.

Examples of suitable polymeric agents can be selected from polyoxyalkylenic compounds such as polyethylene glycol hexadecyl ether; ethylene oxide/propylene oxide copolymers; or mixtures thereof. For example, suitable ethylene oxide/propylene oxide copolymer antifouling agent can comprise one or more —$(CH_2—CH_2—O)_k$— where each k is in the range from 1 to 50; and one or more —$(CH_2—CH(R)—O)_n$— wherein R comprises an alkyl group having from 1 to 6 carbon atoms and each n is in the range from 1 to 50, and terminated by a R' and a R" end groups, wherein R' is OH or an alkoxy having from 1 to 6 carbon atoms and R" is H or an alkyl having from 1 to 6 carbon atoms. In an embodiment, the antifouling agent is a block polymer, more preferably a tri-block polymer. In an embodiment, the antifouling agent is a block polymer of general formula:

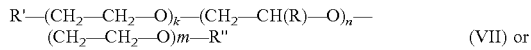 (VII) or

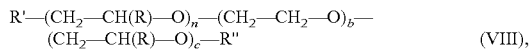 (VIII), wherein R comprises an alkyl group; R' and R" are end groups; k is from 1 to 50; n is from 1 to 50; m is greater than or equal to 1; a is from 1 to 50; b is from 1 to 50; and c is from 0 to 50; k and m and a and c may be the same or different. Preferably R is a C1 to C3 alkyl group. More preferably, R is a methyl group. Preferably, in one embodiment, k is greater than 1 and m is greater than 1. Also preferably, in another embodiment a is 0 or c is 0. Preferred R' and R" groups include H, OH, alkyl, and alkoxy groups. Preferred alkyl groups are C1 to C3 alkyl groups. Preferred alkoxy groups are C1 to C3 alkoxy groups. In formulae (VII) and (VIII) above, it is preferred that R' is OH or an alkoxy group, preferably OH or a C1 to C3 alkoxy group. Further, it is preferred that R" is H or an alkyl group, preferably H or a C1 to C3 alkyl group. A particularly preferred polymer has general formula (IX): R'—(CH$_2$—CH$_2$—O)$_k$—(CH$_2$—CH(CH$_3$)—O)$_n$—(CH$_2$—CH$_2$—O)$_n$—R" (IX), wherein R', R", k, n, and m independently are as defined anywhere above. A further preferred polymer has general formula (X): OH—(CH$_2$—CH$_2$—O)$_k$—(CH$_2$—CH(R)—O)$_n$—(CH$_2$—CH$_2$—O)$_m$—H (X), wherein R, k, n, and m independently are as defined anywhere above. It will be appreciated that, by virtue of the preferred molecular weights for the antifouling agent and the preferred ethylene oxide contents in the present antifouling agent given above, preferred values for a, b, c, k, n, and m can be derived. Preferably, the weight percentage of ethylene oxide in the antifouling agent is in the range of from 5 to 40%, more preferably from 8 to 30%, even more preferably from 10 to 20%, most preferably about 10%. In an embodiment, the ethylene oxide/propylene oxide copolymer has a molecular weight (MVV) greater than 1000 Daltons, preferably greater than 2000 Daltons, more preferably in the range from 2000-4500 Daltons.

Examples of suitable commercially available antifouling agents include those under the trade designation Armostat® (such as Armostate 300 (N,N-bis-(2-hydroxyethyl)-(C$_{10}$-C$_{20}$)alkylamine), Armostate 410 (bis(2-hydroxyethyl)cocoamine), and Armostat® 600 (N,N-bis(2-hydroxy-ethyl) alkylamine) from Akzo Nobel Corporation; those under the trade designation Chemax X997® (>50% of dicocoalkyldimethyl ammonium chloride, about 35% 1-hexene, <2% isopropanol, and <1% hexane); those under the trade designation Atmere 163 (N,N-Bis(2-hydroxy-ethyl) alkylamine) from ICI Americas; those under the trade designation Statsafe 6000 (dodecylbenzenesulfonic acid) from Innospec Limited; those under the trade designation Octastat® 3000 (about 40-50% toluene, about 0-5% propan-2-ol, about 5-15% DINNSA (dinonynaphthasulphonic acid), about 15-30% solvent naphtha, about 1-10% trade secret polymer containing N, and about 10-20% trade secret polymer containing S) from Octel Performance Chemicals; those under the trade designation Kerostate 8190 (about 10-20% alkenes (polymer with sulfur dioxide), about 3-8% benzenesulfonic acid (4-C10-13-sec-alkyl derivatives) and organic solvent) from BASF, those under the trade designation Stadis® 450 (about 14 wt % of polybutene sulfate, about 3 wt % of aminoethanolepichlorohydrin polymer, about 13 wt % of alkylbenzenesulfonic acid, about 70 wt % of toluene and trace amounts of quaternary ammonium salt of aliphatic alkyl and propyl alcohol) from E. I. Du Pont de Nemours & Co.; Synperonic PEL121 (ethyleneoxide-propyleneoxide-ethyleneoxide block copolymer, about 10% of propyleneoxide, MW about 4400 Da) from Uniqema, pluronic 31R1 from BASF, and the like. Preferred examples of antifouling agents are dodecylbenzenesulfonic acid or ethyleneoxide-propyleneoxide block copolymer.

Preferred examples of antifouling agents for use in the invention are Synperonic PEL121, Statsafe 6000, Pluronic 31 R1, Stadis 450, Chemax X997®.

Preferably, antifouling agent is fed to the reactor as a composition with a solvent, preferably dissolved in a solvent. Preferably, the solvent is selected from C4-C10 aliphatic and olefin compounds. Preferably, the solvent is selected from unsaturated (olefin) C4-C10 compounds. In an embodiment, said solvent is selected from hexane, isohexane, hexene, cyclohexane, or heptane.

Preferably, antifouling agent is used in the reactor at a level of from 0.1 to 50 ppm as a function of the diluent in the polymer slurry, preferably from 1.0 to 20 ppm, preferably from 1.0 to 10.0 ppm, preferably from 2.0 to 6.0 ppm.

The process according to the invention has the advantage of preparing bimodal polyethylene fluff having low average particle size.

A process producing polyethylene having low particle size allows better and easier removal of the diluent used in the polymerization. The small size of the fluff particles allow better solids and level control on the reactor, thereby preventing or reducing settling issues. Furthermore, plugging of transfer and discharges lines can be minimized and even avoided.

In one embodiment of the present invention, the polyethylene is particulate and has a D50 ranging from 100 to 400 μm, with D50 being defined as the particle size for which fifty percent by weight of the particles has a size lower than the D50. In an embodiment, the polyethylene has a D50 of at most 350 μm, preferably at most 300 μm, preferably at most 250 μm.

The measurement of the particle size of the polyethylene can be made by sieving techniques. The sieving can be performed with a set of calibrated sieves according to ASTM D-1921-89 particle size (sieve analysis) of Plastic Materials, Method A. Alternatively, the particle size may be measured by using optical measurements, preferably with a Camsizer.

In one embodiment of the present invention, the "polyethylene" or "polyethylene resin" is in the form of a fluff or a powder. For the purpose of this invention, "resin", "powder" or "fluff" is defined as the polymer material after it exits the polymerization reactor (or final polymerization reactor in the case of multiple reactors connected in series).

The polyethylene preferably has a Si content of at most 60 ppm by weight, preferably from 5 to 60 ppm by weight. The Si content is measured by x-ray fluorescence (XRF).

In some preferred embodiment, the atomic Si content of the polyethylene is from 5 to 60 ppm by weight, preferably from 5 to 55 ppm, more preferably from 5 to 50 ppm. Si content is measured by x-ray fluorescence (XRF) according to following procedure:

1. Preparing the 1 mm Thick Sample Discs of Polyethylene for Measuring Si Content by XRF:

15 g of the polyethylene are placed between 2 sheets of Melimex 401 of 125μ, which is then placed between two metallic plates and pressed together under heating to 200° C. An increasing pressure up to 4 bar is then exerted for 2 minutes in the Carver 2518® press. The sample is cooled until hardened, upon which the Melimex sheets are removed. The sample is rolled on itself. The rolled sample is again placed between the Melimex sheets and heated and pressed as before. The sample is then re-rolled on itself again and the heating and pressure applied once more, except that a mould of about 1 mm is included in the inside support of the metallic plate. An increasing pressure up to 4 bar is applied for 10 minutes. The sample is cooled, released from the mould and then punched to obtain 3 discs of 50 mm in diameter and 1 mm in thickness.

2. Measuring the Si Content

XRF is measured on a Philips PW 2400 equipped with an RX tube and a chrome anode using the PANanalytical softwares "SuperQ—software for xray analyzers" version 3.0 and "X40".

A standard reference is used in this method in the form of Si-doped pearls (prepared from aqueous solution of 1000 ppm by weight Si) to cover the equivalent range of Si-content of the polyethylene sample to be measured anywhere from 0 to 1050 ppm. The amount of Si on these pearls is determined by their fluorescence intensity using application 22 of the "X40" software.

The sample holders with the sample polyethylene are held under vacuum. The internal surface of the sample holder is bare; No retention film is used. Using the "SuperQ" software, each Si measurement is made twice and on both surfaces of the sample disc. Thus, 4 measurements are made on each sample disc. Results are expressed in ppm.

Note that the measurements, such as D50 and XRF are made on the polyethylene obtained from the reactor (the fluff), prior to additivation, extrusion and pelletizing.

The present invention also encompasses polyethylene produced according to the present process. The polyethylene of the present invention is suitable for a wide variety of applications.

The present invention also encompasses polyethylene prepared in at least one CSTR in the presence of at least one supported metallocene catalyst, wherein said polyethylene has a D50 ranging from 100 to 400 µm, with D50 being defined as the particle size for which fifty percent by weight of the particles has a size lower than the D50. Preferably, the polyethylene has a D50 of at most 350 µm, preferably at most 300 µm, preferably at most 250 µm.

The present invention also encompasses polyethylene prepared in at least one CSTR in the presence of at least one supported metallocene catalyst, wherein said polyethylene has a Si content of at most 60 ppm by weight, for example at most 55 ppm by weight, for example at most 50 ppm by weight, preferably from 5 to 60 ppm by weight, for example from 5 to 55 ppm by weight, for example from 5 to 50 ppm by weight.

The present invention also encompasses polyethylene prepared in at least one CSTR in the presence of at least one supported metallocene catalyst, wherein said polyethylene has a D50 ranging from 100 to 400 µm, and a Si content of at most 60 ppm by weight, with D50 being defined as the particle size for which fifty percent by weight of the particles has a size lower than the D50. Preferably, the polyethylene has a D50 of at most 350 µm, preferably at most 300 µm, preferably at most 250 µm, and a Si content of for example at most 55 ppm by weight, for example at most 50 ppm by weight, preferably from 5 to 60 ppm by weight, for example from 5 to 55 ppm by weight, for example from 5 to 50 ppm by weight.

One embodiment encompasses a polyethylene prepared according to the process according to the present invention, wherein the polyethylene has a bimodal molecular weight distribution.

One embodiment encompasses a polyethylene comprising a polyethylene prepared according to the process according to the present invention, wherein the polyethylene has a bimodal molecular weight distribution and was prepared in the presence of 1-butene as co-monomer.

Another embodiment encompasses a polyethylene prepared according to the process according to the present invention, wherein the polyethylene has a monomodal molecular weight distribution.

The present inventors have found that polyethylene produced according to the present process have an improved homogeneity. The process provides advantages such as ease of processing.

The present invention also encompasses formed articles comprising the polyethylene produced according to the present process. Due to the improved mechanical properties of the polyethylene of the present invention, it is suitable for a wide variety of applications. Preferred articles are films, pipes, preferably pipes PE-RT (polyethylene of raised temperature resistance), injection molded articles, injection stretch blow molded articles, rotomoulded articles, caps and closures, fibers, sheets, containers, and foams. Polyethylene of raised temperature resistance (PERT), as defined in ISO-1043-1, is a class of polyethylene materials for high temperature applications, such as high temperature pipe applications. By the term "polyethylene of raised temperature resistance" (PERT) is meant polyethylene which is resistant to temperature according to standard EN-ISO 22391 and does not require additives to meet its function of resistance to dilatation.

In another embodiment, the invention provides an article comprising a polyethylene preferably prepared in at least one continuously stirred tank reactor, using a process comprising the step of: polymerizing ethylene in the presence of at least one supported metallocene catalyst, a diluent, optionally one or more co-monomers, and optionally hydrogen, thereby obtaining the polyethylene, wherein the support of said supported metallocene catalyst has a D50 value within the range of from 3 µm to 25 µm, with D50 being defined as the particle size for which fifty percent by weight of the particles has a size lower than the D50; and D50 being measured by laser diffraction analysis on a Malvern type analyzer, and wherein the support of said supported metallocene catalyst has a surface area within the range of from 100 to 500 $m^2/g$.

The following non-limiting example illustrates the invention.

Examples

Silica Supports Used in the Following Examples are Listed in Table 1:

TABLE 1

| Silica | PD-10001 | PD-10001-Ti | H121C | ES70W |
|---|---|---|---|---|
| SA ($m^2/g$) | 285 | 262 | 790 | 268 |
| PV (mL/g) | 1.57 | 1.54 | 0.8 | 1.52 |
| D50 (µm) | 12.5 | 12.5 | 15 | 43 |
| Span | 0.98 | 0.98 | 1.16 | 1.62 |
| Commercial source | PQ Corporation | PD-10001 from PQ Corporation Titanated as described for INV-2 | Asahi Glass Company, Limited | PQ Corporation |

Abbreviations:
SA: surface area;
PV: pore volume

Supported Metallocene Catalyst System:
Supported Catalyst INVENTIVE 1 (INV-1)
1. MAO Treatment 20 g of dried silica PD-10001 were introduced in a 500 mL round-bottomed flask. Toluene was added and the suspension was stirred at 100 rpm. MAO (30 wt % in toluene) was added dropwise via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder was washed with toluene and pentane before being dried under reduced pressure overnight, leading to SMAO free-flowing powder.

2. Metallocene Treatment

In a 250 mL round bottom flask, 9.8 g of the above-obtained SMAO silica were suspended in 80 mL of toluene. Then, 0.2 g of ethylene-bis(4,5,6,7-tetrahydro-1-indenyl) zirconium dichloride in a suspension of 20 mL of toluene were added to the suspended silica-containing support. The resulting suspension was stirred at 100 rpm for 2 hours at room temperature. Finally, the obtained catalyst was filtered, washed with toluene and pentane before being dried overnight, leading to catalyst INV-1.

Supported Catalyst INVENTIVE 2 (INV-2)
1. Support Modification

In a 250 mL round bottom flask conditioned under a light nitrogen flow, 25 g of silica PD-10001 were stirred at 60 rpm and dried at 110° C. overnight. 190 mL of dry hexane were then added. The suspension was cooled at 0° C. and 3.2 mL of VertecBip (20:80 weight ratio of $Ti(OC_4H_9)_4$ to $Ti(OC_3H_7)_4$) were added dropwise to impregnate the support. The suspension was mixed for 20 hours at 0° C. The solvent was removed under reduced pressure and the resulting silica was dried under a nitrogen flow at 450° C. for 4 hours. The Ti-impregnated silica had a Ti content of 2 wt %.

2. MAO Treatment 20 g of modified-silica were introduced in a 500 mL round-bottomed flask. Toluene was added and the suspension was stirred at 100 rpm. MAO (30 wt % in toluene) was added dropwise via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder was washed with toluene and pentane before being dried under reduced pressure overnight.

3. Metallocene Treatment

In a 250 mL round bottom flask, 9.8 g of the above-obtained SMAO silica were suspended in 80 mL of toluene. Then, 0.2 g of ethylene-bis(4,5,6,7-tetrahydro-1-indenyl) zirconium dichloride in a suspension of 20 mL of toluene were added to the suspended silica-containing support. The resulting suspension was stirred at 100 rpm for 2 hours at room temperature. Finally, the obtained catalyst was filtered, washed with toluene and pentane before being dried overnight, leading to catalyst INV-2.

Supported Catalyst COMPARATIVE 1 (COMP-1)
1. MAO Treatment 20 g of dried silica H121C were introduced in a 500 mL round-bottomed flask. Toluene was added and the suspension was stirred at 100 rpm. MAO (30 wt % in toluene) was added dropwise via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder was washed with toluene and pentane before being dried under reduced pressure overnight, leading to SMAO free-flowing powder.

2. Metallocene Treatment

In a 250 mL round bottom flask, 9.8 g of the above-obtained SMAO silica were suspended in 80 mL of toluene. Then, 0.2 g of ethylene-bis(4,5,6,7-tetrahydro-1-indenyl) zirconium dichloride in a suspension of 20 mL of toluene were added to the suspended silica-containing support. The resulting suspension was stirred at 100 rpm for 2 hours at room temperature. Finally, the obtained catalyst was filtered, washed with toluene and pentane before being dried overnight, leading to catalyst COMP-1.

Supported Catalyst COMPARATIVE 2 (COMP-2)
Catalyst COMP-2 was Produced with the Same Recipe as COMP-1 Using ES70W Silica.

1—Process for Preparing Polyethylene Having a Monomodal Molecular Weight Distribution Monomodal polyethylene resins were prepared in one CSTR. The reaction conditions are given in table 2 as well as the properties of the polyethylene.

TABLE 2

| Polymerization conditions Monomodal CSTR grades | | | | |
|---|---|---|---|---|
| Catalyst name | COMP-1 | COMP-2 | Inv-1 | Inv-2 |
| Throughput kg PE/hour | 5.1 | 5.2 | 5.2 | 5.2 |
| Tibal (ppm) | 35 | 39 | 42 | 33 |
| Antifouling (Synperonic) (ppm) | 4 | 4.1 | 4.3 | 3.5 |
| Mileage (g:g) | 3100 | 5580 | 6293 | 11201 |
| Si content (ppm by weight) measured by XRF | 99 | 56 | 49 | 27.5 |
| Ethylene (kg/hour) | 6 | 6 | 6 | 6 |
| H2/C2 molar ratio | 0.0015 | 0.0012 | 0.00013 | 0.0015 |
| Hexane (kg/hour) | 55.5 | 55.5 | 55.2 | 55.3 |
| Temperature (° C.) | 83 | 83 | 83 | 83 |
| Residence Time (hours) | 1.27 | 1.27 | 1.28 | 1.27 |
| MI-2 (g/10 min) | 4.8 | 3.1 | 4.5 | 4.2 |
| Density (g/cm$^3$) | 0.961 | 0.96 | 0.961 | 0.961 |
| D50 (μm) | 622 | 549 | 222 | 212 |
| Bulk Density (g/cm$^3$) | 0.41 | 0.41 | 0.44 | 0.42 |

Density was measured according to ASTM D-1505 at 23° C. MI-2 was determined according to ISO 1133:1997, condition D, at 190° C. and under a load of 2.16 kg. The D50 of the polyethylene particles was determined by sieving technique according to ASTM D 1921-89 particle size (sieve analysis) of Plastic Materials, Method A.

The process according to the invention allowed preparing monomodal polyethylene fluff having low average particle size, compared to the comparative process. Also, the polyethylene according to the invention has reduced catalytic residues. The catalysts according to the invention showed increased activity compared to the comparative example, and the activity was even at least twice as high for the titanated catalyst. The polyethylene with low particle size allowed better and easier removal of the diluent used in the polymerization (here: hexane). The small particle size also allowed better solids and level control on the reactor, thereby preventing or reducing settling issues. Furthermore, plugging of transfer and discharges lines was minimized and even avoided.

Process for Preparing Polyethylene Having a Bimodal Molecular Weight Distribution Polyethylene resins with bimodal molecular weight distribution were prepared in two CSTRs connected in series. These polyethylenes were suitable for preparing films. The reaction conditions are given in table 3 as well as the properties of the polyethylene.

TABLE 3

Polymerization conditions

| Bimodal | RUN 1 | | RUN 2 | |
|---|---|---|---|---|
| | Reactor 1 | Reactor 2 | Reactor 1 | Reactor 2 |
| Catalyst | COMP-1 | | Inv-2 | |
| Throughput kg PE/hour | 2.5 | 4.1 | 2.6 | 4.3 |
| Tibal (ppm) | 40 | 39 | 40 | 39 |
| Antifouling (Synperonic) (ppm) | 3.8 | 3.6 | 3.1 | 2.5 |
| Mileage (g:g) | 4056 | 6650 | 14471 | 22078 |
| Ethylene (kg/hour) | 4.1 | 1.42 | 4.2 | 1.45 |
| Si content (ppm by weight) measured by XRF | 76 | 47 | 22 | — |
| H2/C2 molar ratio | 0.0039 | 0 | 0.0037 | 0 |
| 1 butene (g/hour) | 0 | 76 | 0 | 85 |
| Hexane (kg/hour) | 38 | 5.5 | 36 | 5.3 |
| Temperature (° C.) | 83 | 75 | 83 | 75 |
| Residence Time (hours) | 1.19 | 1.05 | 1.23 | 0.96 |
| MI-2 (g/10 min) | 14 | 1.03 | 16 | 0.92 |
| Density (g/cm³) | 0.966 | 0.951 | 0.967 | 0.950 |
| d50 (μm) | 632 | 862 | 219 | 225 |
| BD (g/cm³) | 0.42 | 0.41 | 0.41 | 0.39 |

Density was measured according to ASTM D-1505 at 23° C. MI-2 was determined according to ISO 1133:1997, condition D, at 190° C. and under a load of 2.16 kg. The D50 of the polyethylene particles was determined by sieving technique according to ASTM D 1921-89 particle size (sieve analysis) of Plastic Materials, Method A.

The process according to the invention allowed preparing bimodal polyethylene fluff having low average particle size, compared to the comparative process. Also, the polyethylene according to the invention has reduced catalytic residues. The catalyst according to the invention had a drastically higher activity compared to the comparative catalyst, and still allowed preparing small size polyethylene powder. The polyethylene with low particle size allowed better and easier removal of the diluent used in the polymerization (here: hexane). The small particle size also allowed better solids and level control on the reactor, thereby preventing or reducing settling issues. Furthermore, plugging of transfer and discharges lines was minimized and even avoided. Furthermore, the bimodal polyethylene produced by the process according to the invention displayed better homogeneity (less gels).

The invention claimed is:

1. A process for preparing a polyethylene resin in at least one continuously stirred tank reactor, comprising the step of:
polymerizing ethylene in the presence of at least one supported metallocene catalyst, a diluent, optionally one or more co-monomers, and optionally hydrogen, thereby obtaining the polyethylene resin,
wherein said supported metallocene catalyst comprises a solid support, a co-catalyst and at least one metallocene, wherein the solid support has a surface area within the range of from 100 to 350 m²/g, and has a D50 value within the range of from 4 μm to 18 μm, with D50 being defined as the particle size for which fifty percent by weight of the particles has a size lower than the D50; and D50 being measured by laser diffraction analysis on a Malvern type analyzer.

2. The process according to claim 1, wherein the polyethylene resin at the end of said process has a D50 of at least 100 and at most 400 μm; and Si content lower than 60 ppm by weight.

3. The process according to claim 1, wherein said at least one supported metallocene catalyst comprises a silica-containing support, an alumoxane, and least one metallocene.

4. The process according to claim 1, wherein said at least one supported metallocene catalyst comprises a silica- and titania-containing support an alumoxane, and least one metallocene.

5. The process according to claim 4, wherein the supported catalyst has a Ti content of from 0.1 to 10% by weight based on the total weight of the supported metallocene catalyst, preferably from 0.5 to 5% by weight, and most preferably from 1.0 to 2.5% by weight.

6. The process according to claim 5, wherein the solid support of said at least one supported metallocene catalyst has an average pore volume of at least 1.0 and at most 3.0 ml/g, preferably at least 1.0 and at most 2.5 ml/g, more preferably at least 1.2 and at most 2.0 ml/g.

7. The process according to claim 1, wherein the metallocene catalyst is a compound of formula (I) or (II)

$$(Ar)_2MQ_2 \quad (I)$$

$$R''(Ar)_2MQ_2 \quad (II)$$

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl (IND), tetrahydroindenyl (THI), and fluorenyl, wherein each of said groups are optionally substituted with one or more substituents each independently selected from the group consisting of halogen, and a hydrocarbyl having 1 to 20 carbon atoms, and wherein said hydrocarbyl optionally contains one or more atoms selected from the group comprising B, Si, S, O, F, and P;
wherein M is a transition metal selected from the group consisting of titanium, zirconium, hafnium, and vanadium; and preferably is zirconium;
wherein each Q is independently selected from the group consisting of halogen, a hydrocarboxy having 1 to 20 carbon atoms, and a hydrocarbyl having 1 to 20 carbon atoms and wherein said hydrocarbyl optionally contains one or more atoms selected from the group comprising B, Si, S, O, F, and P; and
wherein R" is a divalent group or moiety bridging the two Ar groups and selected from the group consisting of C1-C20 alkylene, germanium, silicon, siloxane, alkylphosphine, and an amine, and wherein said R" is optionally substituted with one or more substituents each independently selected from the group consisting of halogen, a hydrocarbyl having 1 to 20 carbon atoms, and wherein said hydrocarbyl optionally contains one or more atoms selected from the group comprising B, Si, S, O, F, and P.

8. The process according to claim 1, wherein the metallocene is a compound selected from one of the following formula (III) or (IV):

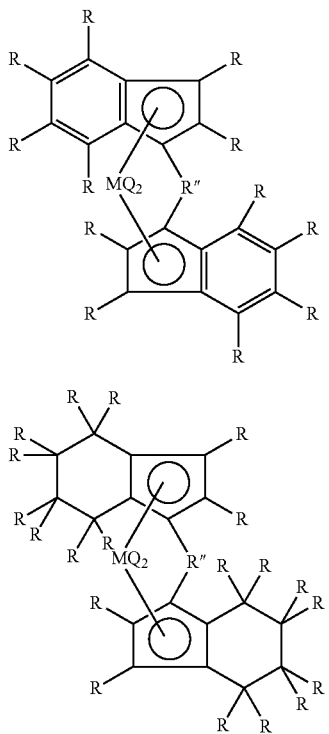

(III)

(IV)

wherein each R in formula (III) or (IV) is the same or different and is selected independently from hydrogen or XR'v in which X is chosen from Group 14 of the Periodic Table, oxygen or nitrogen and each R' is the same or different and is chosen from hydrogen or a hydrocarbyl of from 1 to 20 carbon atoms and v+1 is the valence of X, R" is a structural bridge between the two indenyl or tetrahydrogenated indenyls that comprises a C1 C4 alkylene radical, a dialkyl germanium, silicon or siloxane, or an alkyl phosphine or amine radical; Q is a halogen or a hydrocarbyl radical having from 1 to 20 carbon atoms, preferably Q is F, Cl or Br; and M is a transition metal selected from the group consisting of titanium, zirconium, hafnium, and vanadium.

9. The process according to claim 1, wherein the metallocene catalyst comprises a bridged unsubstituted bis-indenyl and/or a bridged unsubstituted bis-tetrahydrogenated indenyl.

10. The process according to claim 1, wherein the solid support of said at least one supported metallocene catalyst has a particle size distribution of a span value lower than 2.0, wherein the span is defined as:

$$\text{span} = \frac{D90 - D10}{D50}$$

with D90 being defined as the particle size for which ninety percent by weight of the particles has a size lower than the D90;

with D10 being defined as the particle size for which ten percent by weight of the particles has a size lower than the D10;

with D50 being defined as the particle size for which fifty percent by weight of the particles has a size lower than the D50; and with the D90, D10 and D50 being measured by laser diffraction analysis on a Malvern type analyzer.

11. The process according to claim 1, wherein the co-monomer is 1-butene.

12. The process according to claim 1, wherein said polymerization process is performed in the presence of at least one antifouling agent.

13. The process according to claim 1, wherein said process is performed in at least two continuously stirred tank reactors connected in series.

14. The process according to claim 1, wherein said diluent is selected from hexane, isohexane, or heptane.

* * * * *